United States Patent
Yang et al.

(10) Patent No.: US 9,654,607 B2
(45) Date of Patent: May 16, 2017

(54) METHOD AND APPARATUS FOR GENERATING APPLICATION ICON

(75) Inventors: Xiaonian Yang, Beijing (CN); Qian Zhang, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 806 days.

(21) Appl. No.: 14/003,135

(22) PCT Filed: Mar. 2, 2012

(86) PCT No.: PCT/CN2012/071868
§ 371 (c)(1),
(2), (4) Date: Sep. 4, 2013

(87) PCT Pub. No.: WO2012/119527
PCT Pub. Date: Sep. 13, 2012

(65) Prior Publication Data
US 2013/0337873 A1    Dec. 19, 2013

(30) Foreign Application Priority Data

Mar. 4, 2011   (CN) .......................... 2011 1 0053127
Mar. 14, 2011  (CN) .......................... 2011 1 0061126

(51) Int. Cl.
H04B 1/38      (2015.01)
H04M 1/02      (2006.01)
(Continued)

(52) U.S. Cl.
CPC ........ *H04M 1/0266* (2013.01); *G06F 9/4443* (2013.01); *G06F 8/61* (2013.01)

(58) Field of Classification Search
CPC .......................... G06F 3/048; G08B 13/19682
(Continued)

(56) References Cited

U.S. PATENT DOCUMENTS 6,182,116 B1 *  1/2001  Namma ............ G06F 17/30899
                                                348/E5.008
6,216,237 B1 *  4/2001  Klemm ............... G06F 11/3644
                                                714/35
(Continued)

FOREIGN PATENT DOCUMENTS

CN    101056206    10/2007
CN    101436124    5/2009
(Continued)

OTHER PUBLICATIONS

Second Office Action dated Mar. 19, 2014 in corresponding Chinese priority application 2011100531276 (14 pages including English translation).
(Continued)

*Primary Examiner* — Khalid Shaheed
(74) *Attorney, Agent, or Firm* — Brinks Gilson & Lione; G. Peter Nichols

(57) ABSTRACT

A method for generating an application icon and a terminal apparatus are described. The terminal apparatus includes a receiving unit configured to receive prompt information of an application from a server automatically; an icon generating unit configured to generate an icon corresponding to the application in an application icon interface according to the prompt information received by the receiving unit; a first control unit configured to associate the icon generated by the icon generating unit with a first function according to the prompt information, and control the icon to be displayed in a first display effect; and a display unit configured to display the icon generated by the icon generating unit in the first display effect.

17 Claims, 10 Drawing Sheets

(51) Int. Cl.
*G06F 9/44* (2006.01)
*G06F 9/445* (2006.01)

(58) Field of Classification Search
IPC .............................. G08B 13/19682; G09B 5/06
See application file for complete search history.

(56) References Cited

U.S. PATENT DOCUMENTS

| | | | |
|---|---|---|---|
| 8,392,282 B2 | 3/2013 | Nagasaka et al. | |
| 8,738,469 B2 | 5/2014 | Nagasaka et al. | |
| 2003/0233425 A1* | 12/2003 | Lyons | G06F 17/30884 709/217 |
| 2004/0248566 A1 | 12/2004 | Suzuki | |
| 2007/0245347 A1 | 10/2007 | Oya et al. | |
| 2010/0107150 A1 | 4/2010 | Kamada et al. | |
| 2010/0127150 A1* | 5/2010 | Wakeham | B63H 20/10 248/642 |
| 2010/0146442 A1 | 6/2010 | Nagasaka et al. | |
| 2013/0030954 A1 | 1/2013 | Liu et al. | |
| 2013/0139163 A1 | 5/2013 | Nagasaka et al. | |

FOREIGN PATENT DOCUMENTS

| | | |
|---|---|---|
| CN | 101636720 | 1/2010 |
| CN | 101706724 | 5/2010 |
| CN | 101808157 | 8/2010 |
| CN | 101859425 | 10/2010 |
| CN | 101901146 | 12/2010 |
| EP | 1 956 472 | 8/2008 |
| WO | WO 2006/101111 | 9/2006 |

OTHER PUBLICATIONS

First Office Action dated Jun. 17, 2014 in corresponding Chinese Patent Application 201110061126.6 (16 pages including English translation).
Chinese Second Office Action with English Translation for related Application No. 201110061126.6 dated Dec. 23, 2014, 21 pages.
Third Office Action dated Jun. 24, 2015 in corresponding Chinese Patent Application 201110061126.6 (21 pages including English translation).
First Office Action dated Aug. 5, 2013 in corresponding Chinese priority application 2011100531276 (12 pages including English translation).
PCT/CN2012/071868 International Preliminary Report on Patentability dated Sep. 10, 2013 (11 pages).
PCT/CN2012/071868 Written Opinion dated Jun. 1, 2012 (ten pages).
PCT/CN2012/071868 International Search Report dated Jun. 14, 2012 (two pages).

* cited by examiner

700

S710 — receiving a prompt information of an application from server automatically S720 — generating an icon corresponding to the application in an application icon interface according to the prompt information S730 — associating the icon generated with a first function according to the prompt information, and control the icon to be displayed in a first display effect S740 — displaying the icon generated by the icon generating unit in the first display effect S750 — receiving a first selection input, and determining icon to be processed in the icons displayed in the first display effect according to the first selection input S760 — receiving a second selection input, and executing a deleting function to the icon to be processed or executing an installing function to application corresponding to the icon to be processed according to the second selection input

S810 — installing a first application and generating a first icon corresponding to the first application in an application icon interface S820 — displaying the first icon corresponding to the first application in a second display effect S830 — receiving prompt information of a second application from server end automatically S840 — generating a second icon corresponding to the second application in an application icon interface according to the prompt information S850 — displaying the second icon in a first display effect

Fig. 8

METHOD AND APPARATUS FOR GENERATING APPLICATION ICON

This application claims priority to International Application No. PCT/CN2012/071868 filed Mar. 2, 2012; to Chinese Patent Appln. No. CN 201110053127.6 filed Mar. 4, 2011; and to Chinese Patent Appln. No. CN 201110061126.6 filed Mar. 14, 2011; the entire contents of each are incorporated herein by reference.

BACKGROUND

The embodiments of the present disclosure relate to a method for generating an application icon and a terminal apparatus.

With the development of technique and the widespread of network, various kinds of terminal apparatus capable of performing data transmission over network are widely used, for example, personal computer, portable computer, tablet computer, portable cell phone, smart phone and portable music player and so on.

In recent years, for convenience of the user's use, more and more network sites provide various kinds of applications based on operating system, e.g., application programs or widgets and so on. These application programs or widgets have strong function, user-friendly interface, strong entertainment, and substantially improve the experience of the user when using the terminal apparatus.

At present, the user can usually search and download to install these applications or widgets through the third party application store, for example, the App store for the operating system of the electronic products of the apple corporation, the Android Market based on the Android operating system, and usually the user needs to install these downloaded applications or widgets by him/herself, and in some cases the user needs to configure to add them to the application icon interface (e.g., desktop) by him/herself.

Thus the manner of searching the applications is troublesome, and the manner of operating to install the application is complicate, therefore, although the applications or widgets have many advantages, the procedure of searching, installing and setting is relatively complicate, thus it is not advantageous for user to know and download to install the applications or widgets.

SUMMARY

The object of the embodiments of the present disclosure is to provide method for generating an application icon and a terminal apparatus to solve the above problem.

According to one embodiment of the present disclosure, there is provided a terminal apparatus, including: a receiving unit configured to receive prompt information of application from a server automatically; an icon generating unit configured to generate an icon corresponding to the application in an application icon interface according to the prompt information received by the receiving unit; a first control unit configured to associate the icon generated by the icon generating unit with a first function according to the prompt information, and control the icon to be displayed in a first display effect; and a display unit configured to display the icon generated by the icon generating unit in the first display effect.

According to another embodiment of the present disclosure, there is provided a terminal apparatus, including: an installing unit configured to install a first application, and generate a first icon corresponding to the first application in an application icon interface; a display unit configured to display the first icon corresponding to the first application in a second display effect; a receiving unit configured to receive prompt information of a second application from a server end automatically; an icon generating unit configured to generate a second icon corresponding to the second application in the application icon interface according to the prompt information received by the receiving unit, the display unit is further configured to display the second icon generated by the icon generating unit in a first display effect, wherein the first display effect is different from the second display effect.

According to another embodiment of the present disclosure, there is provided a method for generating an application icon applied to a terminal apparatus, the method including: receiving prompt information of an application from server automatically; generating an icon corresponding to the application in an application icon interface according to the prompt information; associating the icon generated by the icon generating unit with a first function according to the prompt information, and control the icon to be displayed in a first display effect; displaying the icon generated by the icon generating unit in the first display effect.

According to another embodiment of the present disclosure, there is provided a method for generating an application icon applied to a terminal apparatus, the method including: installing a first application and generating a first icon corresponding to the first application in an application icon interface; displaying the first icon corresponding to the first application in a second display effect; receiving prompt information of the second application from a server end automatically; generating a second icon corresponding to the second application in the application icon interface according to the prompt information; and displaying the second icon in a first display effect, wherein the first display effect is different from the second display effect.

With the solutions provided in the above-described embodiments of the present disclosure, the terminal apparatus can receive the prompt information of the application sent from the server automatically, and generate icon corresponding to the application in the application icon interface, e.g., a desktop or an application icon list (launcher), so that the user can know new applications that can be obtained from the server end conveniently and intuitively, which improves the efficiency for obtaining the information by user, and simplifies the operation of installing the applications.

BRIEF DESCRIPTION OF THE DRAWINGS

In order to describe the technical solutions of the embodiments of the disclosure more clearly, the accompanying drawings necessary for the description of the embodiments are explained briefly. The accompanying drawings in the following description are only exemplary embodiments of the disclosure.

FIG. 7 is a flow chart illustrating the method for generating the application icon according to the second embodiment of the present disclosure.

FIG. 8 is a flow chart illustrating the method for generating the application icon according to the third embodiment of the present disclosure.

DETAILED DESCRIPTION

Hereinafter, the preferred embodiments of the disclosure will be described in detail with reference to the accompanying drawings. It is noticed that in the specification and the accompanying drawings, substantially same steps and elements are represented by same reference numbers, and the repetitive explanation on these steps and elements would be omitted.

In the following embodiments of the present disclosure, the terminal apparatus refers to the terminal apparatus capable of communicating through network. The specific forms of the terminal apparatus include, but not limited to personal computer, portable computer, tablet computer, portable cell phone and portable music player and so on.

Figure 1:
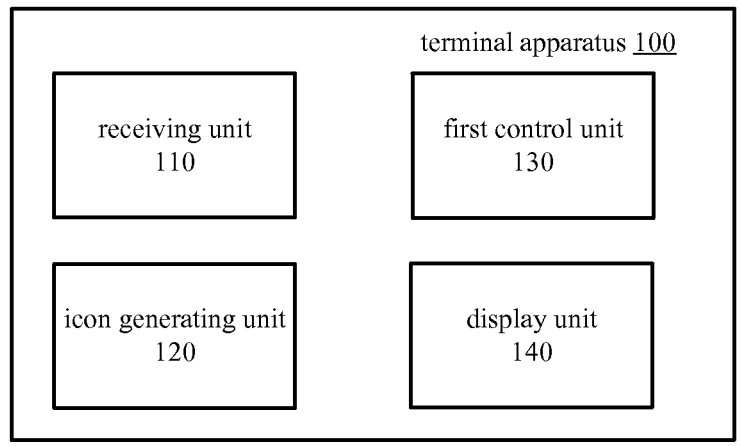
FIG. 1 is a schematic structured block view illustrating the terminal apparatus according to a first embodiment of the present disclosure.

Hereinafter, the terminal apparatus that can be used to generate the application icon according to the embodiment of the present disclosure is described with reference to FIG. 1. FIG. 1 is a schematic structured block view illustrating the terminal apparatus 100 according to the first embodiment of the present disclosure.

As shown in FIG. 1, the terminal apparatus 100 of the embodiment includes: a receiving unit 110, an icon generating unit 120, a first control unit 130 and a display unit 140. In particular, the receiving unit 110 can receive prompt information of the application from a server automatically. For example, the prompt information of the application may be pushed to the terminal apparatus by the server according to the service customized previously by the user, and alternatively, it may be sent to the terminal apparatus by the server directly. Further, the application may be an application newly provided at the server end in a predetermined time period (e.g., within the last month).

The icon generating unit 120 can generate an icon corresponding to the application in the application icon interface according to the prompt information received by the receiving unit 110. In particular, the application icon interface may be a desktop in the Windows operating system or the IOS operating system or an icon list (launcher) in the Android operating system. The icon of the installed application of the terminal apparatus may exist in the application icon interface.

In an alternative embodiment, the terminal apparatus can further include a deciding unit. The deciding unit can decide whether the terminal apparatus has installed the application. When the deciding unit decides that the terminal apparatus has not installed the application, the icon generating unit can generate an icon corresponding to application in the application icon interface according to the prompt information received by the receiving unit. That is, if the application corresponding to the prompt information has installed in the terminal apparatus, the icon generating unit no longer generates the corresponding icon. Further, the deciding unit may further decide whether there is an icon corresponding to the prompt information of the application in the application icon interface. When the deciding unit decides there is no icon corresponding to the prompt information of application in the application icon interface, the icon generating unit can generate an icon corresponding to application in the application icon interface according to the prompt information received by the receiving unit.

The first control unit 130 can associate the icon generated by the icon generating unit with a first function according to the prompt information, and control the icon to be displayed in a first display effect. For example, the first control unit 130 can control the icon to be displayed in a monochrome display effect, or to be displayed in a translucent display effect, and so on. Preferably, the prompt information of the application from the server may include an attention and/or download information in a predetermined time period (e.g., within the last week), the display effect (e.g., the color for display) of the icon of the generated application corresponding to the prompt information is determined according to the prompt information of the application. In particular, the attention and/or download information indicates that the icon of an application of a higher level is displayed in red; the attention and/or download information indicates that the icon of an application of a medium level is displayed in orange; and the attention and/or download information indicates that the icon of an application of a lower level is displayed in yellow.

Further, the first display effect may be different from the display effect of the icons of the installed applications of the terminal apparatus 100 in the application icon interface. The display unit 140 can display the icon generated by the icon generating unit 120 in the first display effect.

In the prior arts, when the user wants to view at least one application recommended by the application store, he/she needs to click the icon of the application store, and see the relevant information of the application recommended by the application store after entering the application store. The operation is troublesome. The procedure of obtaining a new application by the user is very passive, and if the user does not log in the application store actively, the user is basically unaware of which new application is being used in the application store and which application is most concerned in the application store everyday. As compared to the prior arts, the terminal apparatus provided by the present embodiment of the disclosure improves the problem that the operation of viewing the application recommend in the application store is complicate and troublesome. The terminal apparatus provided by the present embodiment of the disclosure can display some applications recommended by the application store or recommended by a friend in a manner of icons in the application icon interface, so that the user can obtain a new application recommended by a friend or the application store intuitively and rapidly without logging in the application store actively.

As compared to the prior arts, the terminal apparatus provided by the present embodiment of the application can display the icons corresponding to some applications recommended by the application store or by a friend in the application icon interface in the first display effect which is different from the display effect of the icon corresponding to the installed application in the terminal apparatus, so that the user can distinguish that, in the application icon interface, which applications are installed applications, and which applications are new applications that are pushed by the application store or by a friend and have not been installed locally yet.

Preferably, the icon generating unit can record generating time of the icon. The first control unit can compare a generating time period from the generating time to the current time with a predetermined threshold, and delete the first icon when the generating time period is larger than the predetermined threshold.

With the terminal apparatus provided in the embodiment, the prompt information of the application sent from the server can be received automatically, and the icon corresponding to the application can be generated in the application icon interface, so that the user can know a new application that can be obtained from the server end conveniently and intuitively, the efficiency for obtaining the information by user is improved, and the operation of installing applications is simplified.

Figure 2:
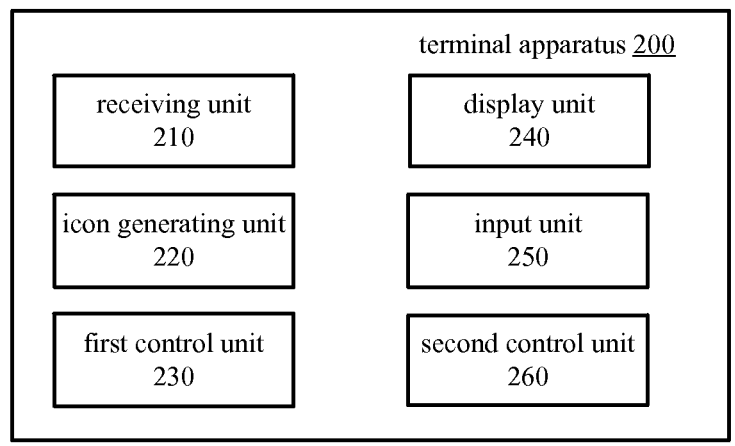
FIG. 2 is a schematic structured block view illustrating the terminal apparatus according to a second embodiment of the present disclosure.

Hereinafter, the terminal apparatus that can be used to generate the application icon according to the second embodiment of the present disclosure is described with reference to FIG. 2. FIG. 2 is a schematic structured block view illustrating the terminal apparatus according to the second embodiment of the present disclosure.

Similar to the terminal apparatus 100 shown in FIG. 1, the terminal apparatus 200 includes: a receiving unit 210, an icon generating unit 220, a first control unit 230 and a display unit 240. In particular, the receiving unit 210 can receive prompt information of the application from a server automatically. The icon generating unit 220 can generate an icon corresponding to the application in the application icon interface according to the prompt information received by the receiving unit 210. The first control unit 230 can associate the icon generated by the icon generating unit with a first function according to the prompt information, and control the icon to be displayed in the first display effect. The display unit 240 can display the icon generated by the icon generating unit 220 in the first display effect.

In this embodiment, the first function may include a deleting function for deleting the icon and/or an installing function for downloading and installing the application corresponding to the icon.

As shown in FIG. 2, the terminal apparatus 200 can further include an input unit 250 and a second control unit 260. In particular, the input unit 250 can receive a first selection input and a second selection input from a user. In particular, the first selection input can be used for determining the icon to be processed in a plurality of icons displayed in the first display effect in the application icon interface. The second selection input can be used for determining to execute the deleting function or the installing function.

The second control unit 260 can determine the icon to be processed in the icons displayed in the first display effect according to the first selection input, and execute the deleting function to the icon to be processed or execute the installing function to the application corresponding to the icon to be processed according to the second selection input. According to the specific demand, the second control unit 260 and the first control unit 230 can be formed independently in physical, and alternatively, the second control unit 260 and the first control unit 230 can be integrated together or the functions of the second control unit and the first control unit can be executed by using one control unit.

Preferably, the prompt information from the server may include an installing information storage address. When the second control unit executes the installing function to the application corresponding to the icon to be processed according to the second selection input, installing information is downloaded from the installing information storage address, and the application corresponding to the icon to be processed is installed according to the installing information.

Further, the second control unit can generate installing completion information after installing the application corresponding to the icon to be processed. The first control unit can associate the icon to be processed with the second function according to the installing completion information, and control to display the icon to be processed in the second display effect. In particular, the second function can be used for starting the application corresponding to the icon. The display unit can display the icon to be processed in the second display effect. For example, the first control unit 130 can control the icon to be displayed in a color display effect or the like. As aforementioned, there may be the icon of the installed application of the terminal apparatus in the application icon interface. The second display effect may be same as the display effect of the icon of the installed application of the terminal apparatus 100 in the application icon interface.

As compared to the prior arts, the terminal apparatus provided by the present embodiment of the disclosure can obtain operations by the operational body to the icons corresponding to some applications recommended by the application store or by a friend, and the terminal apparatus can install the application corresponding to the icon displayed in the first display effect in the application icon interface according to the operation to the icons by the operational body, so as to facilitate the operation of the user. The user does not need to click the icon of the application store as in the prior arts in which the application needs to be installed after a series of complicate and troublesome operation such as selecting the necessary applications from a plurality of recommended applications after entering the application store and clicking the recommend option. The present embodiment of the disclosure only needs the user to execute one operation to the icon displayed in the first display effect in the application icon interface to be able to install the corresponding applications directly, which is convenient and rapid.

According to the second embodiment of the present disclosure, the first function may further include a collecting function and a collecting release function. In particular, the collecting function can be used for keeping the icon from being deleted, and the collecting release function is for releasing the being-kept of the icon. For example, in the case of executing a keeping function to one icon in the application icon interface, when a deleting function is executed to the icon, the deleting operation is invalid. The second control unit can further execute the collecting function or the collecting release function to the icon to be processed according to the second selection input.

Figure 3:
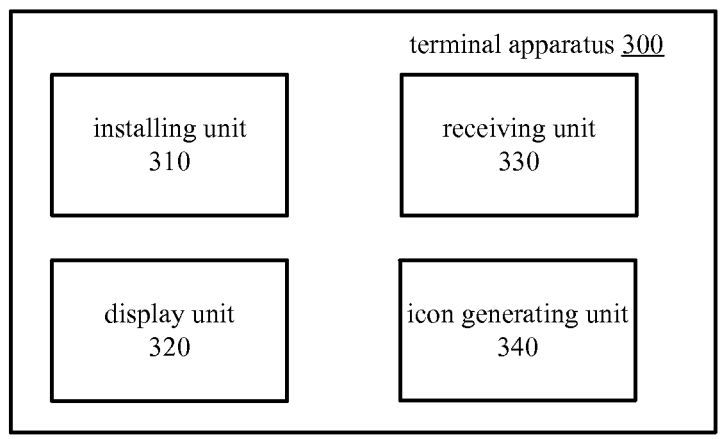
FIG. 3 is a schematic structured block view illustrating the terminal apparatus according to a third embodiment of the present disclosure.
Figure 4:
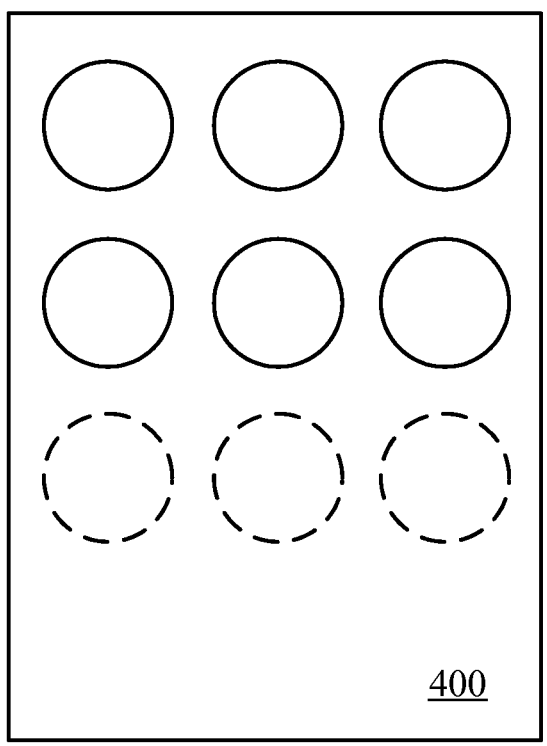
FIG. 4 is an explanatory view illustrating an example situation of the application icon interface of the terminal apparatus shown in FIG. 3.

Hereinafter, the terminal apparatus that can be used for generating the application icon according to the third embodiment of the present disclosure is described with reference to FIG. 3 and FIG. 4. FIG. 3 is a schematic structured block view illustrating the terminal apparatus 300 according to the third embodiment of the present disclosure. FIG. 4 is an explanatory view illustrating an example situation of the application icon interface 400 of the terminal apparatus 300 shown in FIG. 3.

As shown in FIG. 3, the terminal apparatus 300 of the embodiment includes: an installing unit 310, a display unit 320, a receiving unit 330 and an icon generating unit 340. In particular, the installing unit 310 can install a first application, and generate a first icon corresponding to the first application in an application icon interface. As aforementioned, the application icon interface may be a desktop in the Windows operating system or the IOS operating system or an icon list (launcher) in the Android operating system. Preferably, the first icon may be associated with a second function for starting the application corresponding to the icon.

The display unit 320 displays the first icon corresponding to the first application in a second display effect. For example, the first control unit 130 can control the icons to be displayed in a color display effect or the like. As shown in FIG. 4, in the application icon interface 400, the first icon displayed in the second display effect is shown in solid contour line.

The receiving unit 330 receives prompt information of a second application from a server end automatically. For example, the prompt information of the applications may be pushed to the terminal apparatus by the server according to the service customized previously by the user, and alternatively, it may be sent to the terminal apparatus by the server directly. Further, the second application may be application newly provided at the server end in a predetermined time period (e.g., within the last month).

The icon generating unit 340 can generate a second icon corresponding to the second application in the application icon interface according to the prompt information received by the receiving unit 330. Preferably, the second icon is associated with the first function. In particular, the first function may include a deleting function for deleting the icons and/or an installing function for downloading and installing the applications corresponding to the icons. The display unit 320 can display the second icon generated by the icon generating unit in a first display effect, wherein the first display effect is different from the second display effect. For example, the display unit 320 displays the second icon in a monochrome or a translucent display effect. As shown in FIG. 4, in the application icon interface 400, the second icon displayed in the first display effect is shown in dashed contour line.

Figure 5:
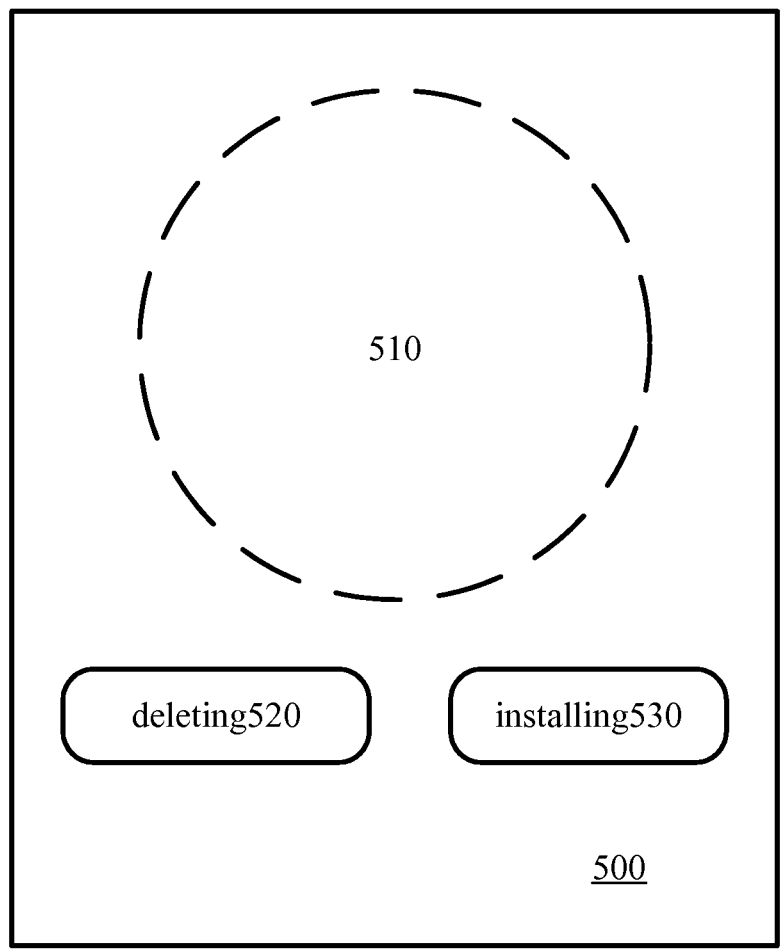
FIG. 5 is an explanatory view illustrating an example situation of a selection key for selecting to execute a deleting function and an installing function included in a first function displayed in the display unit.

Further, according to the third embodiment of the present disclosure, the installing unit can further execute the installing function to the application corresponding to the second icon according to an installing selection input, and generate installing completion information. For example, when user clicks the second icon, a selection key for selecting to execute the above-described deleting function and installing function included in the first function may be popped-up. FIG. 5 is an explanatory view illustrating an example situation of a selection key for selecting to execute the deleting function and the installing function included in the first function displayed in the display unit 500. As shown in FIG. 5, when the second icon 510 is selected in the application icon interface, a deleting key 520 and an installing key 530 are popped-up. When user clicks the installing key 530, the installing unit can further execute the installing function to the application corresponding to the second icon according to the installing selection input, and generate installing completion information. The display unit can further display the second icon in the second display effect according to the installing completion information, to indicate that the application corresponding to the icon has been installed.

Figure 6:
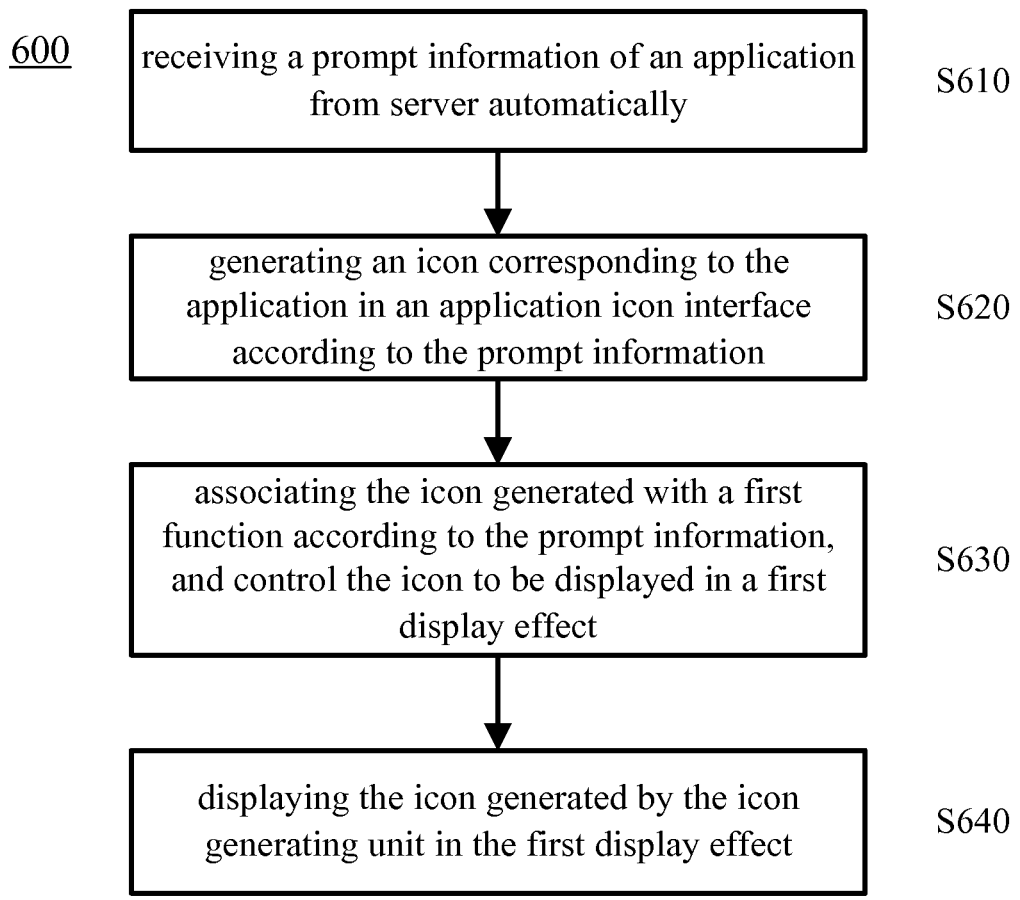
FIG. 6 is a flow chart illustrating the method for generating the application icon according to the first embodiment of the present disclosure.

Hereinafter, the method for generating an application icon of the first embodiment of the present disclosure is explained with reference to FIG. 6. FIG. 6 is a flow chart illustrating the method 600 for generating an application icon according to the first embodiment of the present disclosure. The respective steps in the method 600 for generating an application icon can be executed by the above-described corresponding units in the terminal apparatus 100 shown in FIG. 1, and thus they will no longer described specifically for simplicity.

As shown in FIG. 6, in step S610, the prompt information of the applications from a server is received automatically. For example, the prompt information of the applications may be pushed to the terminal apparatus by the server according to the service customized previously by the user, and alternatively, it may be sent to the terminal apparatus by the server directly. Further, the application may be an application newly provided at a server end in a predetermined time period (e.g., within the last month).

In step S620, the icon corresponding to the application is generated in the application icon interface according to the prompt information. In particular, the application icon interface may be a desktop in the Windows operating system or the IOS operating system or an icon list (launcher) in the Android operating system. There may be the icon of the installed application of the terminal apparatus in the application icon interface.

According to the first embodiment of the present disclosure, whether the terminal apparatus has installed the application can be decided in step S620, and when the terminal apparatus has not installed the applications, the icon corresponding to the application is generated in the application icon interface according to the prompt information. Alternatively, whether there is the icon corresponding to the prompt information of the applications in the application icon interface can be decided in step S620, and when there is no the icon corresponding to the prompt information of the application in the application icon interface, the icon corresponding to the application can be generated in the application icon interface according to the prompt information.

In step S630, the icon generated by the icon generating unit is associated with the first function according to the prompt information, and the icon is controlled to be displayed in the first display effect. For example, the icon can be controlled to be displayed in a monochrome display effect, or to be displayed in a translucent display effect, and so on. Preferably, the prompt information of the applications from the server may include an attention and/or download information in a predetermined time period (e.g., within the last week), the display effect (e.g., color for display) of the icon of the generated application corresponding to the prompt information is determined according to the prompt information of the applications.

Further, the first display effect may be different from the display effect of the icon of the installed application of the terminal apparatus 100 in the application icon interface. In step S640, the icon generated by the icon generating unit is displayed in the first display effect.

Preferably, the method 600 for generating an application icon can further include recording generating time of the icon, and comparing a generating time period from the generating time to the current time with the predetermined threshold. When the generating time period is larger than the predetermined threshold, the first icon can be deleted.

With the method for generating an application icon provided in the embodiment, the prompt information of the application sent from the server can be received automatically, and the icon corresponding to the application can be generated in the application icon interface, e.g., a desktop or an application icon list, so that the user can know new applications that can be obtained from the server end conveniently and intuitively, the efficiency for obtaining the information by user is improved, and the operation for installing applications is simplified.

Hereinafter, the method for generating an application icon of the second embodiment of the present disclosure is explained with reference to FIG. 7. FIG. 7 is a flow chart illustrating the method 700 for generating an application icon according to the second embodiment of the present disclosure. The respective steps in the method 700 for generating an application icon can be executed by the above-described corresponding units in the terminal apparatus 200 shown in FIG. 2, and thus they will no longer described specifically for simplicity.

Similar to the method shown in FIG. 6, in step S710, the prompt information of the application from the server is received automatically. In step S720, the icon corresponding to the application is generated in the application icon interface according to the prompt information. As aforementioned, according to the second embodiment of the present disclosure, whether the terminal apparatus has installed the application can be decided in step S720, and when the terminal apparatus has not installed the application, the icon corresponding to the application is generated in the application icon interface according to the prompt information. Alternatively, whether there is the icon corresponding to the prompt information of the application in the application icon interface can be decided in step S720, and when there is no icon corresponding to the prompt information of the application in the application icon interface, the icon corresponding to the application can be generated in the application icon interface according to the prompt information. In step S730, the icon generated by the icon generating unit is associated with the first function according to the prompt information, and the icon is controlled to be displayed in the first display effect. And in step S740, the icon generated by the icon generating unit is displayed in the first display effect.

In this embodiment, the first function may include a deleting function for deleting the icon and/or an installing function for downloading and installing the application corresponding to the icon.

As shown in FIG. 7, the method 700 for generating an application icon further include step S750 and step S760. In particular, in step S750, a first selection input is received, and an icon to be processed is determined in the icons displayed in the first display effect according to the first selection input. Then in step S760, a second selection input is received, and the deleting function is executed to the icon to be processed or the installing function is executed to the application corresponding to the icon to be processed according to the second selection input. In particular, the first selection input can be used for determining the icon to be processed in a plurality of icons displayed in the first display effect in the application icon interface. The second selection input can be used for determining to execute the deleting function or the installing function.

Preferably, the prompt information from the server may include an installing information storage address. When the installing function is executed to the application corresponding to the icon to be processed according to the second selection input, the installing information can be downloaded from the installing information storage address, and the application corresponding to the icon to be processed is installed according to the installing information.

Further, according to the second embodiment of the present disclosure, the method 700 for generating an application icon can further comprise generating installing completion information after installing the application corresponding to the icon to be processed; associating the icon to be processed with the second function according to the installing completion information; and controlling the icon to be processed to be displayed in a second display effect; and displaying the icon to be processed in the second display effect. In particular, the second function can be used for starting the application corresponding to the icon. The icon to be processed can be displayed in the second display effect. As aforementioned, there may be the icon of the installed application of the terminal apparatus in the application icon interface. The second display effect may be same as the display effect of the icon of the installed application of the terminal apparatus in the application icon interface.

According to the second embodiment of the present disclosure, the first function may further include a collecting function and a collecting release function. In particular, the collecting function is for keeping the icon from being deleted, and the collecting release function is for releasing the being-kept of the icon. For example, in the case of executing a keeping function to one icon in the application icon interface, when a deleting function is executed to the icon, the deleting operation is invalid.

The method 700 for generating an application icon can further include executing the collecting function or the collecting release function to the icon to be processed according to the second selection input. That is, the second selection input can be used for determining to execute one of the deleting function, the installing function, the collecting function or the collecting release function included in the first function.

Hereinafter, the method for generating an application icon of the third embodiment of the present disclosure is explained with reference to FIG. 8. FIG. 8 is a flow chart illustrating the method 800 for generating the application icon according to the third embodiment of the present disclosure. The respective steps in the method 800 for generating application icons can be executed by the above-described corresponding units in the terminal apparatus 300 shown in FIG. 3, and thus they will no longer described specifically for simplicity.

As shown in FIG. 8, in step S810, the first application is installed, and a first icon corresponding to the first application is generated in the application icon interface. In particular, the first application can be installed, and the first icon corresponding to the first application is generated in the application icon interface. As aforementioned, the application icon interface may be a desktop in the Windows operating system or the IOS operating system or an icon list (launcher) in the Android operating system. Preferably, the first icon may be associated with the second function for starting the application corresponding to the icon. In step S820, the first icon corresponding to the first application is displayed in the second display effect.

In step S830, the prompt information of the second application is received automatically from the server end. For example, the prompt information of the application may be pushed to the terminal apparatus by the server according to the service customized previously by the user, and alternatively, it may be sent to the terminal apparatus by the server directly. Further, the second application may be application newly provided at the server end in a predetermined time period (e.g., within the last month).

In step S840, a second icon corresponding to the second application is generated in the application icon interface according to the prompt information. Preferably, the second icon is associated with the first function. In particular, the first function may include the deleting function for deleting the icons and/or the installing function for downloading and installing the application corresponding to the icons. And finally, in step S850, the second icon is displayed in the first display effect. Wherein, the first display effect is different from the second display effect.

Further, according to the third embodiment of the present disclosure, the method 800 shown in FIG. 8 can further include executing the installing function to the application corresponding to the second icon according to an installing selection input and generating installing completion information; and displaying the second icon in the second display effect according to the installing completion information to indicate that the application corresponding to the icon has been installed.

It should be noted that the respective steps of the method shown in FIG. 8 need not to be executed in the order shown. Some steps can be executed reversely or in parallel. For example, automatically receiving the prompt information of the second application from the server end (S830), generating the second icon corresponding to the second application in the application icon interface according to the prompt information (S840) and displaying the second icon in the first display effect (S850) may be executed at the same time as installing the first application and generating the first icon corresponding to the first application in the application icon interface (S810) and displaying the first icon corresponding to the first application in the second display effect (S820), or step S830 to step S850 can be executed first, and then step S810 and step S820 are executed.

In the prior art, when the user wants to view at least one application recommended by the application store, he/she needs to click the icon of the application store, and see the relevant information of the application recommended by the application store after entering the application store. The operation is troublesome. The procedure of obtaining new applications by the user is very passive, and if the user does not log in the application store actively, the user is basically unaware of which new application is being used in the application store and which application is most concerned in the application store everyday. As compared to the prior arts, the terminal apparatus provided by the present embodiment of the application improves the problem that the operation of viewing the application recommend in the application store is complicate and troublesome. The terminal apparatus provided by the present embodiment of the application can display some applications recommended by the application store or recommended by a friend in a manner of icons in the application icon interface, so that the user can obtain new applications recommended by a friend or by the application store intuitively and rapidly without logging in the application store actively.

As compared to the prior arts, the terminal apparatus provided by the present embodiment of the application can display the icons corresponding to some applications recommended by the application store or by a friend in the application icon interface in the first display effect which is different from the display effect of the icon corresponding to the installed application in the terminal apparatus, so that the user can distinguish that, in the application icon interface, which application is the installed application, and which application is new application that is pushed by the application store or by a friend and has not been installed locally yet.

As compared to the prior arts, the terminal apparatus provided by the present embodiment of the application can obtain operations by the operational body to the icons corresponding to some applications recommended by the application store or by a friend, and the terminal apparatus can install the application corresponding to the icon displayed in the first display effect in the application icon interface according to the operation to the icon by the operational body, so as to facilitate the operation of the user. The user does not need to click the icon of the application store as in the prior arts in which the application needs to be installed after a series of complicate and troublesome operation such as selecting the necessary application from a plurality of recommended applications after entering the application store and clicking the recommend option. The present embodiment of the disclosure only needs the user to execute one operation to the icon displayed in the first display effect in the application icon interface to be able to install the corresponding application directly, which is convenient and rapid.

As aforementioned, with the development of smart portable terminal, the mode of "application store" gets more and more attentions. The respective terminal manufacturers or operators have established their own application store online one after another, and built an icon for accessing the application store (hereinafter referred as "the application store icon") in the terminal apparatus, so as to allow the terminal user to access the application store by selecting the application store icon, browse the various kinds of applications such as games and tools or the like in the application store, and download proper applications as necessary. With the mode of application store, the content in the user terminal is more rich, so as to satisfy the diverse and personalized need of the user.

However, on the one hand, the concept of "application store" is not popularized in the user at present. Even if the application store icon is built-in the terminal, many users never click the icon due to incomprehension. On the other hand, even if the user understands the concept of "application store" and wants to access the application store by the application store icon, in a case that the applications in the user terminal are more and more, it is difficult for the user to find the application store icon from among the plural application icons.

For the above instance, the fourth embodiment of the present disclosure provides a display device, a display method and a terminal apparatus which are capable of leading the user to enter the application store in a user-friendly manner. Further, the fourth embodiment of the present disclosure provides a display device; a display method and a terminal apparatus which are capable of making the user enter the application store rapidly without clicking the application store icon.

According to one aspect of the fourth embodiment of the present disclosure, there is provided a display method applied to a terminal apparatus, the display method includes: detecting an operation when at least part of a first picture of a first application is displayed in display region of the terminal apparatus, wherein the first picture including a first tag, the first tag being for running a second application installed in the terminal apparatus and corresponding to the first tag; deciding whether the operation is an operation intended to move the first picture out of the display region; and displaying a second picture in response to the operation when it is decided that the operation is the operation intended to move the first picture out of the display region, wherein the second picture includes at least a second tag, the second tag being for indicating that a third application corresponding to the second tag can be installed into the terminal apparatus.

Displaying the second picture can include: deciding whether there is the second picture; and invoking the second picture when it is decided that there is the second picture and displaying the invoked second picture; generating the second picture when it is decided that there is not the second picture and displaying the generated second picture.

Displaying the second picture can include: accessing a predetermined address in response to the operation to obtain data about the second picture; and generating the second picture based on the data about the second picture; and displaying the second picture.

Displaying the second picture can include: receiving data about the second picture from a predetermined address; generating the second picture based on the data about the second picture in response to the operation; and displaying the second picture.

The first tag and the second tag can be displayed in different display effects.

Displaying the second picture in response to the operation can include: adding at least one picture in the first application in response to the operation as the second picture; and displaying the second picture.

Displaying the second picture in response to the operation can include: starting a fourth application in response to the operation; and displaying the picture of the fourth application as the second picture.

The second picture can include a third tag, wherein the third tag is for running a fifth applications installed in the terminal apparatus corresponding to the third tag, wherein the fifth application is for accessing pages about the third application.

According to another aspect of the fourth embodiment of the present disclosure, there is provided a display device including: a detecting unit for detecting an operation when at least part of a first picture of a first application is displayed in display region of the terminal apparatus, wherein the first picture including a first tag, the first tag being for running a second application installed in the terminal apparatus corresponding to the first tag; a first deciding unit for deciding whether the operation is an operation intended to move the first picture out of the display region; and a display processing unit for displaying a second picture in response to the operation when it is decided that the operation is the operation intended to move the first picture out of the display region, wherein the second picture including at least a second tag, the second tag being for indicating that a third application corresponding to the second tag can be installed into the terminal apparatus.

The display processing unit can include: a second deciding unit for deciding whether there is the second picture; an invoking unit for invoking the second picture when the second deciding unit decides that there is no the second picture; a generating unit for generating the second picture when the second deciding unit decides that there is no the second picture; and a display unit for displaying the second picture.

The display processing unit can include: a first acquiring unit for accessing a predetermined address in response to the operation to obtain data about the second picture; and a first generating unit for generating the second picture based on the data about the second picture; and a display unit for displaying the second picture.

The display processing unit can include: a second acquiring unit for receiving data about the second picture from a predetermined address; a second generating unit for generating the second picture based on the data about the second picture in response to operation; and a display unit for displaying the second picture.

The display processing unit can include: an adding unit for adding at least one picture in the first application in response to the operation as the second picture; and a display unit for displaying the second picture.

The display processing unit can include: a starting unit for starting a fourth application in response to the operation; and a display unit for displaying the picture of the fourth application as the second picture.

According to yet another aspect of the fourth embodiment of the present disclosure, there is provided a terminal apparatus including: a sensor for detecting an operation when at least part of a first picture of a first application is displayed in display region of the terminal apparatus, wherein the first picture includes a first tag, the first tag being for running a second application installed in the terminal apparatus corresponding to the first tag; a storage for storing the first application, the second application and the first tag; a processor for deciding whether the operation is an operation intended to move the first picture out of the display region, and instructing to display a second picture in response to the operation when it is decided that the operation is the operation intended to move the first picture out of the display region, wherein the second picture includes at least a second tag, the second tag being for indicating that a third application corresponding to the second tag can be installed into the terminal apparatus; and a display for displaying the second picture.

With the display device, the display method and the terminal apparatus according to the embodiment of the present disclosure, the user is made to be led to enter the application store in a user-friendly manner. Further, with the terminal apparatus and the display method thereof according to the embodiment of the present disclosure, the user is made to enter the application store rapidly without clicking the application store icon.

The fourth embodiment of the present disclosure will be described in detail with reference to the accompanying drawings hereinafter.

Firstly, the display method according to the fourth embodiment of the present disclosure is described with reference to FIG. 9.

The display method is applied to portable terminal apparatus such as mobile phone, tablet computer or the like. The terminal apparatus includes a display unit. The display unit includes a display region. Further, the terminal apparatus may also include a touch sensor to sense operations of the user. Preferably, the touch sensor is arranged with the display unit in a stacked manner. For example, the touch sensor can be arranged over the display unit. Further, the terminal apparatus may also include an acceleration sensor (e.g., a gravitation sensing unit) for sensing the operations of the user.

Further, various types of applications are included in the terminal apparatus. The applications include desktop applications (such as Launcher applications in the Android system), and also include various kinds of other applications installed into the terminal apparatus by the user him/herself or installed to the terminal apparatus in advance as leaving the factory. In the following description, the desktop applications are referred as the first application, and the applications capable of being managed by the first application are referred as the second application.

In particular, the first application is for displaying the tag (such as icon, title or the like) of the second application in the display region of (the display unit of) the terminal apparatus. When the number of the second application is large, since the area of the display region is limited, the tag of the second application cannot be displayed in the display region all at the same time. Therefore, the tags of the second application are usually arranged by a certain order (e.g., the installation or modification time of the second application, the initials of the name of the second application), and the tags arranged are displayed in the display region in divided screen in form of matrix. When the user wants to select the tag of the second application being not displayed in the display region currently, the picture being displayed in the display region currently is moved out of the display region gradually (e.g., column by column) through a certain operation (normally, sliding operation leftwards or rightwards), and at the same time the picture being not displayed in the display region currently is moved in the display region gradually (e.g., column by column). In other words, the displayed picture of the first application can be understood as an entirety constituted by one or more sub-pictures. Each sub-picture in the one or more sub-pictures corresponds to a picture of a screen displayed in the display region. Further, each sub-picture includes the tag of the second application. Hereinafter, the displayed picture of the first application (the entirety constituted by one or more sub-pictures) is referred as the first picture, and the tag of the second application is referred as the first tag.

The display method includes:

Step S1001: detecting an operation when at least part of the first picture of the first application is displayed in the display region of the terminal apparatus.

As aforementioned, the first picture of the first application includes one or more sub-pictures. At least part of the first picture (i.e., one sub-picture of the first picture) is displayed in the display region of the terminal apparatus when the display method starts. The first picture includes the first tag, and the first tag is for running the second application installed in the terminal apparatus corresponding to the first tag.

At this time, the display method can detect an operation by the touch sensor. In particular, the display method can detect a tracing point of a touch operation by the touch sensor so as to recognize the touch operation. For example, the display method can detect a series of tracing points of the touch operation so as to recognize the touch operation as a sliding operation, and obtain the direction of the touch operation.

Alternatively, the display method can detect an operation by an acceleration sensor. In particular, the display method can detect an acceleration of an operation by the acceleration sensor so as to recognize the operation. For example, the display method can detect an amount of variation of an angular acceleration and/or linear acceleration of the operation, so as to recognize the operation as a tilt operation, and obtain the direction of the operation. The method that the display method detects an operation by the touch sensor or the acceleration sensor is known for those skilled in the art, and it is no longer described in detail here. Of course, the touch sensor and the acceleration sensor are only examples for implementing the display method of the fourth embodiment of the application. The display method can detect the operation by other sensors (e.g., a sound sensor) than the touch sensor, the acceleration sensor.

Step S1002: deciding whether the operation is an operation intended to move the first picture out of the display region.

More particularly, as aforementioned, the display method obtains the direction of the operation through step S1001. In step S1002, the display method carries out the above-described decision according to the direction. More particularly, for example, the display method obtains information of the at least part of the first picture displayed currently (i.e., sub-picture displayed currently), so as to learn when the sub-picture displayed currently is the first sub-picture or the last sub-picture of the first picture. When the sub-picture displayed currently is the first sub-picture or the last sub-picture of the first picture, the display method decides whether the sub-picture displayed currently matches the direction obtained in step S1001 according to a preset matching relation between the sub-picture and the operation. When the sub-picture displayed currently matches the direction, the display method decides that the operation is the operation intended to move the first picture out of the display region.

For example, the display method can preset that the operation leftwards is associated with the last sub-picture of the first picture, and preset that the operation rightwards is associated with the first sub-picture of the first picture. Therefore, when the operation detected in step S1001 by the display method is an operation leftwards and it learns that the sub-picture displayed currently is the last sub-picture, the display method decides that the two match, and thereby decides the operation is the operation intended to move the first picture out of the display region. Similarly, when the operation detected in step S1001 by the display method is operation rightwards and it learns that the sub-picture displayed currently is the first sub-picture, the display method decides that the two match, and thereby decides the operation is the operation intended to move the first picture out of the display region.

On the other hand, when the display method obtains the information of the sub-picture displayed currently and thereby learns the sub-picture displayed currently is not the first sub-picture nor the last sub-picture, the display method decides the operation is an operation intended for moving a part displayed currently in the first picture out of the display region gradually and moving a part being not displayed currently in the first picture into the display region gradually at the same time, and executing the corresponding process.

In the above embodiment, the display method obtains the information of the sub-picture displayed currently and carries out decision according to it. Alternatively, the display method may not obtain the information of the sub-picture displayed currently. For example, the display method can preset that operation upwards or downwards corresponds to an operation intended to move the first picture out of the display region. In this case, when the operation detected in step S1001 is an operation upwards or downwards, the display method decides that the operation is the operation intended to move the first picture out of the display region.

Alternatively, the display method can also carry out the decision in step S1002 by the following process.

In particular, in one example of the fourth embodiment of the application, the area of the first picture is larger than the area of the display region, and the first picture can move along the first direction with respect to the display region, in other words, the length of the first picture in the first direction is larger than the length of the display region in the corresponding direction. Therefore, the display method can determine whether at least part of the first picture displayed currently includes one of two boundaries corresponding to the first direction in the first picture. When it determines that at least a part of the first picture displayed currently includes one of the two boundaries corresponding to the first direction, the display method decides whether the boundary matches the operation obtained in step S1001. When the two match, the display method decides that the operation is the operation intended to move the first picture out of the display region. For example, in order to describe conveniently, it is assumed that the first direction is the horizontal direction of the display unit, the two boundaries corresponding to the horizontal direction are the left and right boundaries of the first picture, and the left boundary corresponds to the operation of right direction, and the right boundary corresponds to the operation of left direction. After the display method determines that at least part of the first picture displayed currently includes the right boundary of the first picture, it further decides whether the operation obtained in step S1001 matches the right boundary. When the operation obtained in step S1001 is the operation leftwards, the display method decides that the two match, and the operation is the operation intended to move the first picture out of the display region. When the operation obtained in step S1001 is operation rightwards, the display method decides that the two do not match, and the display method ends.

On the other hand, in another example of the fourth embodiment of the application, the first picture cannot move with respect to the display region along the second direction (e.g., the vertical direction of the display unit), in other words, the length of the first picture in the second direction is less than or equal to the length of the display region in the corresponding direction. Therefore, the display method can decide whether the operation obtained at step S1001 is an operation in the second direction. When the operation obtained at step S1001 is the operation in the second direction, the display method decides that the operation is the operation intended to move the first picture out of the display region.

Those skilled in the art can understand that the assumption about the first direction and the corresponding boundary thereto and the second direction is only for the convenience of description, and it does not limit the present disclosure. Further, the above-described respective embodiments can be used separately or in combination.

Step S1003: displaying the second picture in response to the operation when it is decided that the operation is the operation intended to move the first picture out of the display region.

When it is decided that the operation is the operation intended to move the first picture out of the display region at step S1002, the display method decides whether there is the second picture. When it is decided that there is the second picture, the display method invokes the second picture, and displays the invoked second picture. When the display method decides that there is no second picture, the second picture is generated and displayed, wherein the second picture includes at least one second tag. The second tag is for indicating that the third application corresponding to the second tag is capable of being installed into the terminal apparatus. In other words, the second tag is for directing the user to install the third application corresponding to the second tag. The third application may be applications in the application store, and it may also be applications downloaded into the terminal apparatus of the user but have not being installed. The second tag may be icon, name or the like of the third application.

More particularly, the display method can access a predetermined address in response to the operation to obtain data about the second picture. The predetermined address is for example the website of the application store. That is, when a positive decision is obtained at step S1002, the display method accesses the application store, and obtains information of icon, name, download address or the like about the third application. Hereafter, the display method generates the second picture based on information of icon, name, website of introduction/download page or the like of the third application, so that the tag (icon, name or the like) is included in the generated second picture. That is, in this case, the display method generates the second picture in same operational steps as those after clicking the application store icon.

Alternatively, the display method can receive data about the second picture from predetermined address. For example, the display method receives information of icon, name, download address or the like about the third application from the website of the application store in a predetermined interval (e.g., one hour or the like). The predetermined interval can be determined appropriately by those skilled in the art or the user as necessary. Hereafter, when a positive decision is obtained at step S1002, the display method generates the second picture based on information of icon, name, website of introduction/download page or the like of the third application, so that the tag (icon, name or the like) of the third application is included in the generated second picture. That is, in this case, the display method generates the second picture in a manner similar to the push service. Preferably, the display method can analyze the favorite of the user by the operational history of the user, and send the favorite information of the user to on-line store, so that the on-line store pushes the third application conforming to the favorite of the user.

Hereafter, when it detects that the user clicks the tag of the third application, the display method can access the introduction/download page of the third application through the corresponding website of the introduction/download page. Alternatively, the display method can also download the third application directly through the website of the introduction/download page. Alternatively, in the case that the third application has been already downloaded but not installed into the terminal apparatus, the display method can also install the third application into the terminal apparatus. That is, with the tag of the third application, it can indicate the user that the third application is capable of being installed into the terminal apparatus, that is, it leads the user to understand, download or install the third application.

Further, preferably, in this case, a third tag corresponding to the fifth application can be included in the second picture, the fifth application has already been installed into the terminal apparatus, and is for accessing the page about the third application. In other words, the fifth application corresponds to the applications of "the application store" in the prior arts. Therefore, the fifth application is a specific second application of the second application, and the third tag is a specific first tag corresponding to the specific second application of the first tag. When the display method detects that the user clicks the third tag, the display method accesses the website according to preset website of the application store to let the user to further browse and select. With the third tag and the fifth applications corresponding thereto, in the case that none of the third applications corresponding to the second tag conform to the desire of the user, the user can click the third tag (e.g., icon titled as "more applications") included in the second picture to view more third applications.

Further, in the display method of the embodiments of the present disclosure, the second picture can be generated in at least two manners.

In particular, in a first manner, at least one picture is added in the first application in response to the operation as the second picture. By taking Android system as example, the display method adds an independent interface in the launcher menu module in the operating system as the second picture. Information about the second picture (i.e., the above-described icon, name, website of the introduction/download page or the like of the third application) is provided by the service end of the application store. In other words, in this manner, the second picture is a newly added sub-picture in the first picture.

In a second manner, the second picture is generated independent of the first application in response to the operation. In other words, in this manner, a fourth application is started in response to the operation and the picture of the fourth application is displayed as the second picture. By taking Android system as example, unlike the above mentioned, rather than adding an interface in the launcher menu module in the operating system, the display method newly adds an application module (the fourth application) independent of the launcher menu module, the application module is for generating a picture of its own according to information about the second picture (i.e., the above-described icon, name, website of introduction/download page or the like of the third application) as the second picture. Further, in Android system, the display method can also generate the second picture through a module of Notification column or prompt column. Preferably, the overall effect (such as background, font or the like) of the second picture generated by the fourth application is similar to the overall effect of the first picture generated by the launcher menu module. In other words, in this manner, the second picture is a picture that has similar overall effect as the first picture and is independent of the first picture.

Further, no matter the second picture is generated by the above-described first manner or second manner, preferably, the display method displays the first tag and the second tag in different display effects. For example, the display method displays the first tag in a first brightness and displays the second tag in a second brightness different from the first brightness, so as to facilitate the user to distinguish the first tag with the second tag. Of course, the first brightness and the second brightness are only examples, the display method can also display the first tag and the second tag in other various kinds of display effects (e.g., the first or the second tag is added shadow, the first tag and the second tag are displayed in different sizes, and so on), as long as it can facilitate the user to distinguish.

Besides distinguishing through display effects, the display method can also prompt the user to distinguish the first picture and the second picture in other manners. For example, the display method can generate an image including a plurality of first symbols corresponding to the plurality of sub-pictures of the first picture and a second symbol corresponding to the second picture, add the image into each sub-picture and the second picture, and highlight the symbol corresponding to corresponding picture as displaying the picture. For example, it is assumed that the first picture includes five sub-pictures, for example, the display method can generate an image including five long horizontal lines and one short horizontal line, and add it into each sub-picture and the second picture. When the picture displayed currently is a certain sub-picture in the first picture, the long horizontal line corresponding to the sub-picture is displayed with highlight (e.g., brightened, magnified or the like). When the picture displayed currently is the second picture, the short horizontal line corresponding to the second picture is displayed with highlight, thus, the user is made to distinguish the first picture and the second picture.

The display method according to the fourth embodiment of the present disclosure is described above. In the display method in the fourth embodiment of the application, the second picture including second tag is displayed by detecting an operation and when it is decided that the operation is the operation intended to move the first picture out of the display region, to indicate that the third application corresponding to the second tag is capable of being installed into the terminal apparatus, so as to lead the user to enter the application store in a user-friendly manner. On the other hand, with the display method of the fourth embodiment of the present disclosure, the user is made to enter the application store rapidly by a simple operation without searching the application store icon in numerous application icons.

The display method according to the fourth embodiment of the present disclosure is described above. Hereinafter, the display device and the terminal apparatus according to the fourth embodiment of the present disclosure will be described with reference to FIG. 10 and FIG. 11.

For example, the display device is a display device of the terminal apparatus such as mobile phone, tablet computer or the like. The display device includes a display unit. The display unit includes a display region. Further, the display device may also include a touch sensor to sense an operation of the user. Preferably, the touch sensor is arranged with the display unit in a stacked manner. For example, the touch sensor can be arranged over the display unit. Further, the display device may also include an acceleration sensor (e.g., a gravitation sensing unit) for sensing the operation of the user. Further, the display device may also include a sound sensor to sense the operation of the user.

Figure 10:
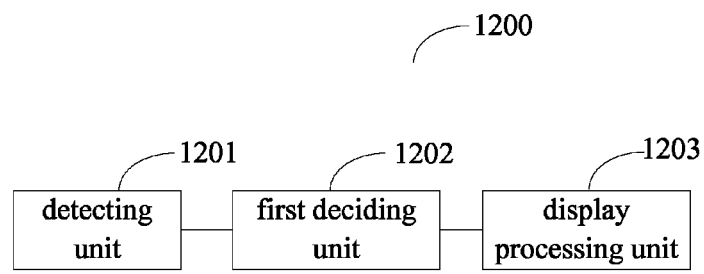
FIG. 10 is a block view illustrating the main configuration of a display device according to the fourth embodiment of the present disclosure.

FIG. 10 is a block view illustrating the main configuration of the display device according to the fourth embodiment of the present disclosure. As shown in FIG. 10, the display device 1200 according to the fourth embodiment of the present disclosure mainly includes: a detecting unit 1201, a first deciding unit 1202 and a display processing unit 1203.

When at least part of the first picture of the first application is displayed in the display region of the display device, the detecting unit 1201 detects an operation, wherein the first picture includes a first tag; the first tag is for running a second application installed in the display device corresponding to the first tag.

In particular, the detecting unit 1201 may include touch sensor. The touch sensor detects a tracing point of a touch operation so as to recognize the touch operation. For example, the detecting unit 1201 can detect a series of tracing points of the touch operation so as to recognize the touch operation as a sliding operation, and obtain the direction of the touch operation.

Alternatively, the detecting unit 1201 may include acceleration sensor. In particular, the acceleration sensor detects an acceleration of the operation so as to recognize the operation. For example, the detecting unit 1201 can detect an amount of variation of an angular acceleration and/or linear acceleration of the operation, so as to recognize the operation as tilt operation, and obtain the direction of the operation.

The method that the touch sensor or the acceleration sensor detects the operation is known for those skilled in the art, and it is no longer described in detail here. Of course, the touch sensor and the acceleration sensor are only examples. The detecting unit 1201 can detect the operation by other sensors (e.g., a sound sensor) than the touch sensor, the acceleration sensor.

The first deciding unit 1202 decides whether the operation is the operation intended to move the first picture out of the display region.

In particular, as aforementioned, the detecting unit 1201 obtains the direction of the operation. The first deciding unit 1202 carries out the above-described decision according to the direction. More particularly, for example, the first deciding unit 1202 obtains information of the at least part of the first picture displayed currently (i.e., the sub-picture displayed currently), so as to learn whether the sub-picture displayed currently is the first sub-picture or the last sub-picture of the first picture. When the sub-picture displayed currently is the first sub-picture or the last sub-picture of the first picture, the first deciding unit 1202 decides whether the sub-picture displayed currently matches the direction obtained by the first deciding unit 1202 according to a preset matching relation between the sub-picture and the operation. When the sub-picture displayed currently and the direction match, the first deciding unit 1202 decides that the operation is the operation intended to move the first picture out of the display region.

For example, the first deciding unit 1202 can preset that the operation leftwards is associated with the last sub-picture of the first picture, and preset that the operation rightwards is associated with the first sub-picture of the first picture. Thereby, when the operation detected by the first deciding unit 1202 is an operation leftwards, and the first deciding unit 1202 learns that the sub-picture displayed currently is the last sub-picture, the first deciding unit 1202 decides that the two match, and thereby decides that the operation is the operation intended to move the first picture out of the display region. Similarly, when the operation detected by the first deciding unit 1202 is an operation rightwards, and the first deciding unit 1202 learns that the sub-picture displayed currently is the first sub-picture, the first deciding unit 1202 decides that the two match, and thereby decides that the operation is the operation intended to move the first picture out of the display region.

On the other hand, when the first deciding unit 1202 obtains the information of the sub-picture displayed currently and thereby learns that the sub-picture displayed currently is not the first sub-picture nor the last sub-picture, the first deciding unit 1202 decides that the operation is an operation intended for moving a part displayed currently in the first picture out of the display region gradually and moving a part being not displayed currently in the first picture into the display region gradually at the same time, so that the display device 1200 is made to execute the corresponding process.

In the above embodiment, the first deciding unit 1202 obtains the information of the sub-picture displayed currently and carries out decision according to it. Alternatively, the first deciding unit 1202 may not need to obtain the information of the sub-picture displayed currently. For example, the first deciding unit 1202 can preset that the operation upwards or downwards corresponds to the operation intended to move the first picture out of the display region. In this case, when the operation detected by the detecting unit 1201 is an operation upwards or downwards, the first deciding unit 1202 decides that the operation is the operation intended to move the first picture out of the display region.

Alternatively, the first deciding unit 1202 can also be configured and operate as follows:

In particular, in the first example of the fourth embodiment of the application, the area of the first picture is larger than the area of the display region, and the first picture can move along the first direction with respect to the display region, in other words, the length of the first picture in the first direction is larger than the length of the display region in the corresponding direction. Therefore, the first deciding unit 1202 can determine whether at least part of the first picture displayed currently includes one of two boundaries corresponding to the first direction in the first picture. When it determines that at least part of the first picture displayed currently includes one of two boundaries corresponding to the first direction, the first deciding unit 1202 decides whether the boundary and the operation obtained by the detecting unit 1201 match. When the two match, the first deciding unit 1202 decides that the operation is the operation intended to move the first picture out of the display region.

On the other hand, in the second example of the fourth embodiment of the application, the first picture cannot move with respect to the display region along the second direction (e.g., the vertical direction of the display unit), in other words, the length of the first picture in the second direction is less than or equal to the length of the display region in the corresponding direction. Therefore, the first deciding unit 1202 can decide whether the operation obtained by the detecting unit 1201 is the operation in the second direction. When the operation obtained by the detecting unit 1201 is the operation in the second direction, the first deciding unit 1202 decides that the operation is the operation intended to move the first picture out of the display region.

When the first deciding unit 1202 decides that the operation is the operation intended to move the first picture out of the display region, the display processing unit 1203 displays the second picture in response to the operation. In particular, the display processing unit 1203 can include: a second deciding unit for deciding whether there is the second picture; an invoking unit for invoking the second picture when the second deciding unit decides that there is no the second picture; a generating unit for generating the second picture when the second deciding unit decides that there is no the second picture; and a display unit for displaying the second picture.

The second picture includes at least one second tag; the second tag is for indicating that the third application corresponding to the second tag is capable of being installed into the display device. In other words, the second tag is for directing the user to install the third application corresponding to the second tag. The third application may be applications in the application store, and it may also be applications downloaded into the display device of the user but have not been installed. The second tag may be icon, name or the like of the third application.

More particularly, the display processing unit may include: a first acquiring unit (not shown) for accessing a predetermined address in response to the operation to obtain data about the second picture; and a first generating unit (not shown) for generating the second picture based on the data about the second picture; and a display unit (not shown) for displaying the second picture. The first acquiring unit can access the predetermined address in response to the operation to obtain the data about the second picture. The predetermined address is for example the website address of the application store. That is, when a positive decision is obtained by the first deciding unit 1202, the first acquiring unit accesses the application store, and obtains information of icon, name, download address or the like about the third application. Hereafter, the first generating unit generates the second picture based on information of icon, name, website of introduction/download page or the like of the third application, so that the tag (icon, name or the like) of the third application is included in the generated second picture. That is, in this case, the first generating unit generates the second picture in same operational steps as those after clicking the application store icon.

Alternatively, the display processing unit can include: a second acquiring unit (not shown) for receiving data about the second picture from the predetermined address; a second generating unit (not shown) for generating the second picture based on the data about the second picture in response to the operation; and a display unit (not shown) for displaying the second picture. The second acquiring unit can receive the data about the second picture from the predetermined address. For example, the second acquiring unit receives information of icon, name, download address or the like about the third application from the website address of the application store in a predetermined interval (e.g., one hour or the like). The predetermined interval can be determined appropriately by those skilled in the art or user as necessary. Hereafter, when a positive decision is obtained by the first deciding unit 1202, the second generating unit generates the second picture based on information of icon, name, website of introduction/download page or the like of the third application, so that the tag (icon, name or the like) of the third application is included in the generated second picture. That is, in this case, the second generating unit generates the second picture in a manner similar to the push service. Preferably, the second generating unit can analyze the favorite of the user by the operational history of the user, and send the favorite information of the user to on-line store, so that the on-line store pushes the third application conforming to the favorite of the user.

Further, in the display device of the fourth embodiment of the application, the display processing unit 1203 may comprise: an adding unit (not shown) for adding at least one picture in the first application in response to the operation as the second picture; and a display unit (not shown) for displaying the second picture. In particular, the adding unit adds at least one picture in the first application in response to the operation as the second picture. By taking Android system as example, the adding unit adds an independent interface in the launcher menu module in the operating system as the second picture. Information about the second picture (i.e., the above-described icon, name, website of the introduction/download page or the like of the third application) is provided by the service end of the application store. In other words, the second picture is a newly added sub-picture in the first picture.

In another example of the fourth embodiment, the display processing unit 1203 may further include: a starting unit (not shown) for starting a fourth application in response to the operation; and a display unit (not shown) for displaying the picture of the fourth application as the second picture.

Further, preferably, the display processing unit 1203 displays the first tag and the second tag in a different display effect. For example, the display processing unit 1203 displays the first tag in a first brightness and displays the second tag in a second brightness different from the first brightness, so as to facilitate the user to distinguish the first tag and the second tag. Of course, the first brightness and the second brightness are only examples, the display processing unit 1203 can also display the first tag and the second tag in other various kinds of display effects (e.g., the first or the second tag is added shadow, the first tag and the second tag are displayed in different sizes, and so on), as long as it can facilitate the user to distinguish.

Besides distinguishing through display effects, the display processing unit 1203 can also prompt the user to distinguish the first picture and the second picture in other manners. For example, the display processing unit 1203 can generate an image including a plurality of first symbols corresponding to the plurality of sub-pictures of the first picture and a second symbol corresponding to the second picture, add the image into each sub-picture and the second picture, and highlight the symbol corresponding to corresponding picture as displaying the picture. For example, it is assumed that the first picture includes five sub-pictures, for example, the display processing unit 1203 can generate an image including five long horizontal lines and one short horizontal line, and add it into each sub-picture and the second picture. When the picture displayed currently is a certain sub-picture in the first picture, the long horizontal line corresponding to the sub-picture is displayed with highlight (e.g., brightened, magnified or the like). When the picture displayed currently is the second picture, the short horizontal line corresponding to the second picture is displayed with highlight, thus, the user is made to distinguish the first picture and the second picture.

The display device according to the embodiment of the present disclosure is described above. With the display device of the embodiments of the present disclosure, the user is led to enter the application store in a user-friendly manner. On the other hand, with the display device of the embodiments of the present disclosure, the user is made to enter the application store rapidly by a simple operation without searching the application store icon in numerous application icons.

Figure 11:
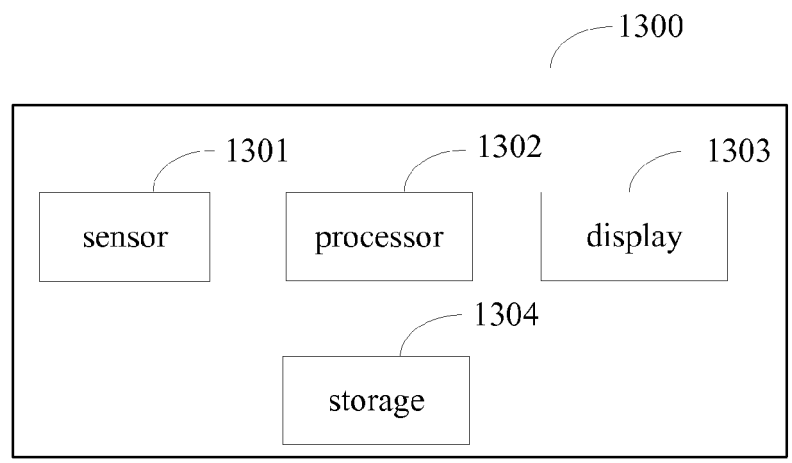
FIG. 11 is a block view illustrating the main configuration of the terminal apparatus according to the fourth embodiment of the present disclosure.

The terminal apparatus 1300 according to the fourth embodiment of the present disclosure is described with reference to FIG. 11 hereinafter. As shown in FIG. 11, the terminal apparatus 1300 includes: a sensor 1301, a processor 1302, a display 1303 and a storage 1304. The sensor 1301, the processor 1302, the display 1303 and the storage 1304 couple with each other directly or indirectly.

When at least part of the first picture of the first application is displayed in the display region of the terminal apparatus, the sensor 1301 detects an operation, wherein the first picture includes a first tag; the first tag is for running a second application installed in the terminal apparatus corresponding to the first tag. The sensor 1301 may be a touch sensor or an acceleration sensor.

The processor 1302 decides whether the operation is the operation intended to move the first picture out of the display region; instructs to display the second picture in response to the operation when the operation is decided as the operation intended to move the first picture out of the display region, wherein the second picture includes at least one second tag, the second tag is for indicating that the third application corresponding to the second tag is capable of being installed into the terminal apparatus.

The display 1303 displays the second picture.

The storage 1304 stores the first application, the second application and the first tag.

Figure 9:
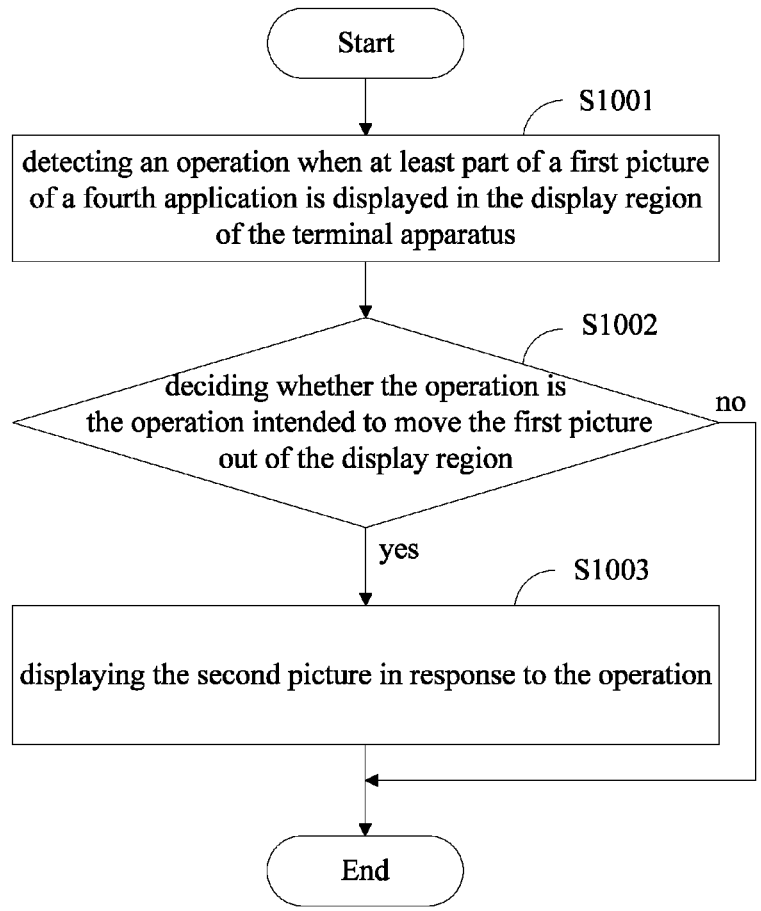
FIG. 9 is a flow chart of the operation of the display method according to a fourth embodiment of the present disclosure.

The configuration and operation of the sensor 1301, the processor 1302, the display 1303 and the storage 1304 are described in the display method of the fourth embodiment of the application with reference to FIG. 9, and are no longer described in detail here.

The terminal apparatus according to the fourth embodiment of the present disclosure is described above. In the terminal apparatus of the fourth embodiment of the application, the second picture including the second tag is displayed by detecting an operation and when it is decided that the operation is the operation intended to move the first picture out of the display region, to indicate the third application corresponding to the second tag is capable of being installed into the terminal apparatus, so as to lead the user to enter the application store in a user-friendly manner. On the other hand, with the terminal apparatus of the fourth embodiment of the present disclosure, the user is made to enter the application store rapidly by a simple operation without searching the application store icon in numerous application icons.

Figure 12A:
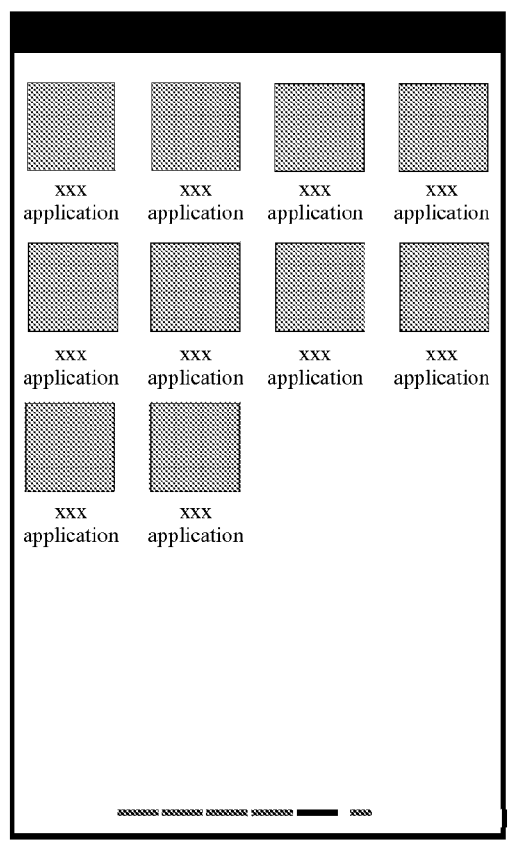
FIGS. 12A to 12C are a schematic view of the display of the terminal apparatus according to the fourth embodiment of the present disclosure each.
Figure 12B:
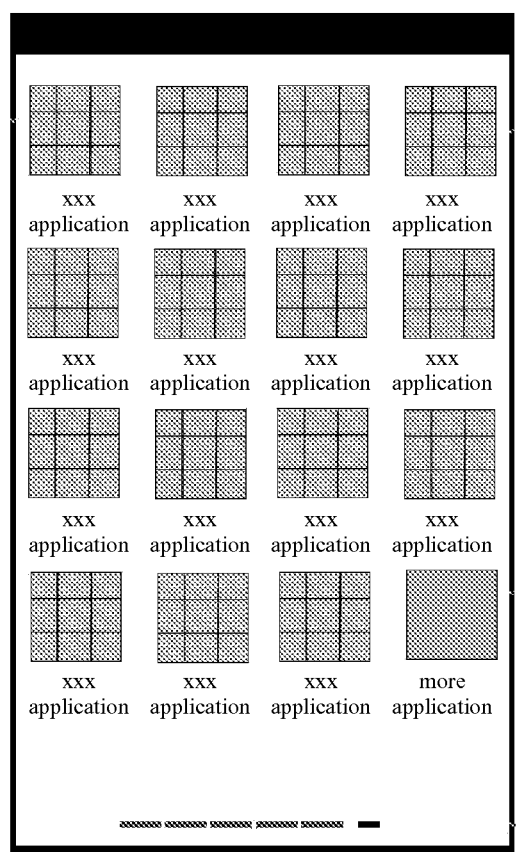
Figure 12C:
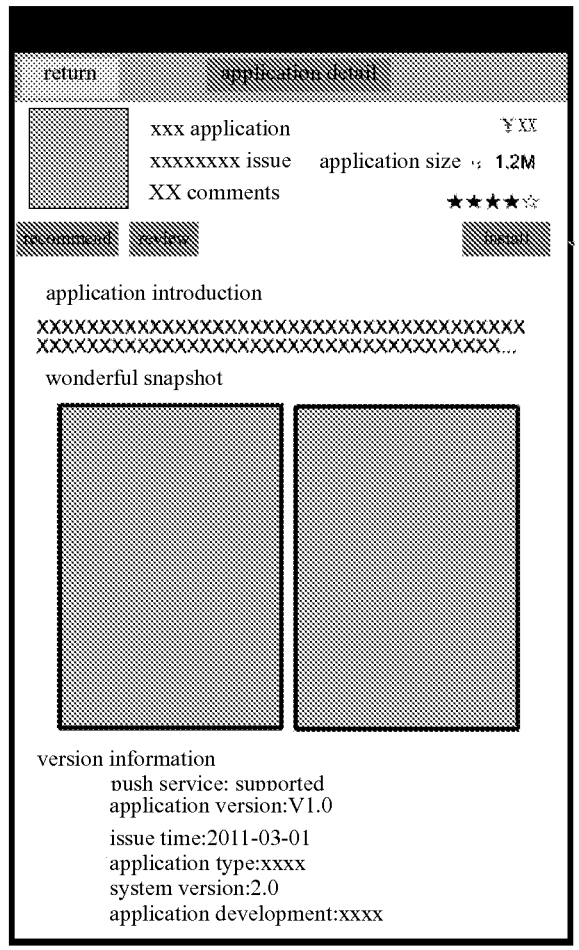

FIGS. 12A to 12C are schematic views of the display of the terminal apparatus according to the fourth embodiment of the present disclosure. In the terminal apparatus as shown in FIG. 12A to FIG. 12C, the first picture of the first application includes five sub-pictures, the picture shown in FIG. 12A is the last sub-picture in the first picture, and ten first tags corresponding to ten second applications are included therein. And, the icons of the second application are displayed in a first display effect. At this time, if the terminal apparatus detects the operation intended to move the first picture out of the display region, for example, detects a sliding operation leftwards, the terminal apparatus displays the second picture as shown in FIG. 12B. The second picture includes fifteen second tags corresponding to fifteen third applications. And, the icons of the third application are displayed in a second display effect (as the shadow grid in FIG. 12B) different from the first display effect. Further, the second picture further includes a third tag (i.e., the tag "more applications") corresponding to the fifth application for accessing the application store. The third tag can be displayed in the same second display effect as that of the second tag. However, preferably, the third tag is displayed in the same first display effect as that of the first tag, as shown in FIG. 12B. At this time, if the terminal apparatus detects that the user clicks a certain second tag in the second picture, the terminal apparatus can access the website address of introduction/download page related to the second tag, and display introduction/download page as shown in FIG. 12C for leading the user to download the third application corresponding to the second tag. Of course, as aforementioned, when the terminal apparatus detects that the user clicks a certain second tag in the second picture, it can download the third application corresponding to the second tag through the website address of the introduction/download page directly without displaying the page as shown in FIG. 12C. Alternatively, in the case that the third application has been already downloaded but not installed into the terminal apparatus, the third application can be installed into the terminal apparatus. That is, with the tag of the third application, it can indicate the user that the third application is capable of being installed into the terminal apparatus, that is, it leads the user to understand, download or install the third application.

Further, as shown in the bottom of FIG. 12A and FIG. 12B, the terminal apparatus generates an image including five long horizontal lines and one short horizontal line, and adds it into each sub-picture and the second picture. When the picture displayed currently in FIG. 12A is the last sub-picture of the first picture, the long horizontal line corresponding to the last sub-picture is displayed with highlight. When the picture displayed currently in FIG. 12B is the second picture, the short horizontal line corresponding to the second picture is displayed with highlight, thus, the user is made to distinguish the first picture and the second picture more easily. Hereafter, when it detects that the user clicks the tag of the third application, the terminal apparatus can access the introduction/download page of the third application through the corresponding website address of the introduction/download page.

The display device, the display method and the terminal apparatus according to the fourth embodiment of the present disclosure are described above with reference to FIGS. 9 to 12.

Here, those skilled in the art can understand that, the display method, the display device and the terminal apparatus according to the fourth embodiment of the present disclosure can be used separately, and can also be used in combination with the method for generating an application icon and terminal apparatus according to the first to the third embodiment of the present disclosure. That is, after applying the method for generating an application icon according to the first to the third examples of the present disclosure to generate the icons, for example, generate icons or the first icon and the second icon, the display method according to the fourth embodiment of the present disclosure can be employed to switch between the scene before generating the icons and the scene of displaying the icons, or switch between the scene of displaying the first icon and the scene of displaying the second icon. At this time, the tag mentioned in the display method according to the fourth embodiment of the present disclosure is the application icon. However, the display method according to the fourth embodiment of the present disclosure can also be used separately, and in this case, the tag is not limited to the generated application icon.

And, in the description of the fourth embodiment of the application, the desktop applications is taken as the first application and other applications that can be managed by the desktop application are taken as the second to the fifth applications, when it is combined with the method for generating an application icon of the first to the third embodiments, the second to the fifth applications can be applications that generate icons by the method for generating an application icon according to the first to the third embodiments. Therefore, the wording "first" to "fifth" here is only for distinguishing between the respective applications and is not intended to make any specific limitation to the applications.

In particular, in the case that first embodiment and the fourth embodiment of the present disclosure are combined, the embodiment of the present disclosure provides a terminal apparatus including: a receiving unit configured to receive the prompt information of the first application from the server automatically; an icon generating unit configured to generate the first icon corresponding to the first application in the application icon interface according to the prompt information received by the receiving unit; a first control unit configured to associate the first icon generated by the icon generating unit with the first function according to the prompt information, and control the first icon to be displayed in the first display effect; and a first display unit configured to display the first icon generated by the icon generating unit in the first display effect.

In the above-described terminal apparatus, the following are further included: a detecting unit for detecting an operation when at least part of the first picture of the third application is displayed in the display region of the terminal apparatus, wherein the first picture includes the first icon, the first icon is for running the first application installed in the display device corresponding to the first icon; a second deciding unit for deciding whether the operation is the operation intended to move the first picture out of the display region; and a display processing unit for displaying the second picture in response to the operation when the second deciding unit decides that the operation is the operation intended to move the first picture out of the display region, wherein the second picture includes at least one second icon, the second icon is for indicating that the second application corresponding to the second icon is capable of being installed into the terminal apparatus.

In the above-described terminal apparatus, the display processing unit includes: a third deciding unit for deciding whether there is the second picture; an invoking unit for invoking the second picture when the third deciding unit decides that there is the second picture; a first generating unit for generating the second picture when the third deciding unit decides that there is no the second picture; and a second display unit for displaying the second picture.

In the above-described terminal apparatus, the display processing unit includes: a first acquiring unit for accessing the predetermined address in response to the operation to obtain the data about the second picture; and a second generating unit for generating the second picture based on the data about the second picture; and a third display unit for displaying the second picture.

In above-described terminal apparatus, the display processing unit includes: a second acquiring unit for receiving the data about the second picture from the predetermined address; a third generating unit for generating the second picture based on the data about the second picture in response to the operation; and a fourth display unit for displaying the second picture.

In the above-described terminal apparatus, the display processing unit displays the first icon and the second icon in different display effects.

In the above-described terminal apparatus, the display processing unit includes: an adding unit for adding at least one picture in the third application in response to the operation as the second picture; and a fifth display unit for displaying the second picture.

In the above-described terminal apparatus, the display processing unit includes: a starting unit for starting the fourth application in response to the operation; and a sixth display unit for displaying the picture of the fourth application as the second picture.

In the above-described terminal apparatus, the second picture includes a third icon, wherein the third icon is for running a fifth application installed in the terminal apparatus corresponding to the third icon, wherein the fifth application is for accessing pages about the second application.

And, in the case that the second and the third embodiment of the present disclosure are combined with the fourth embodiment of the present disclosure, the embodiment of the present disclosure provides a terminal apparatus including: an installing unit configured to install the first application and generate the first icon corresponding to the first application in the application icon interface; a first display unit configured to display the first icon corresponding to the first application in the second display effect; a receiving unit configured to receive the prompt information of the second application from a server end automatically; an icon generating unit configured to generate the second icon corresponding to the second application in the application icon interface according to the prompt information received by the receiving unit, the first display unit is further configured to display the second icon generated by the icon generating unit in the first display effect, wherein the first display effect is different from the second display effect.

In the above-described terminal apparatus, the following are further included: a detecting unit for detecting an operation when at least part of the first picture of the fourth application is displayed in the display region of the terminal apparatus, wherein the first picture includes the first icon and the second icon, the first icon and the second icon are for running the first application and the second application installed in the display device and corresponding to the first icon and the second icon respectively; a first deciding unit for deciding whether the operation is the operation intended to move the first picture out of the display region; and a display processing unit for displaying the second picture in response to the operation when the first deciding unit decides that the operation is the operation intended to move the first picture out of the display region, wherein the second picture includes at least one third icon, the third icon is for indicating that the third application corresponding to the third icon is capable of being installed into the terminal apparatus.

In the above-described terminal apparatus, the display processing unit includes: a second deciding unit for deciding whether there is the second picture; an invoking unit for invoking the second picture when the second deciding unit decides that there is the second picture; a first generating unit for generating the second picture when the second deciding unit decides that there is no the second picture; and a second display unit for displaying the second picture.

In the above-described terminal apparatus, the display processing unit includes: a first acquiring unit for accessing the predetermined address in response to the operation to obtain the data about the second picture; and a second generating unit for generating the second picture based on the data about the second picture; and a third display unit for displaying the second picture.

In above-described terminal apparatus, the display processing unit includes: a second acquiring unit for receiving the data about the second picture from the predetermined address; a third generating unit for generating the second picture based on the data about the second picture in response to the operation; and a fourth display unit for displaying the second picture.

In the above-described terminal apparatus, the display processing unit displays the third icon in a display effect different from that of each of the first icon and the second icon.

In the above-described terminal apparatus, the display processing unit includes: an adding unit for adding at least one picture in the third application in response to the operation as the second picture; and a fifth display unit for displaying the second picture.

In the above-described terminal apparatus, the display processing unit includes: a starting unit for starting the fifth application in response to the operation; and a sixth display unit for displaying the picture of the fifth application as the second picture.

In the above-described terminal apparatus, the second picture includes a fourth icon, wherein the fourth icon is for running a sixth application installed in the terminal apparatus and corresponding to the fourth icon, wherein the sixth application is for accessing pages about the third application.

Similar to the above mentioned, in the case that first embodiment and the fourth embodiment of the present disclosure are combined, the embodiment of the present disclosure provides a method for generating an application icon applied in a terminal apparatus, the method includes: receiving the prompt information of the first application from the server automatically; generating the first icon corresponding to the first application in the application icon interface according to the prompt information; associating the first icon generated by the icon generating unit with the first function according to the prompt information, and controlling the first icon to be displayed in the first display effect; and displaying the first icon generated by the icon generating unit in the first display effect.

In the above-described method, an operation is detected when at least part of the first picture of the third application is displayed in the display region of the terminal apparatus, wherein the first picture includes the first icon, the first icon is for running the first application installed in the electronic apparatus and corresponding to the first icon; whether the operation is the operation intended to move the first picture out of the display region is decided; and the second picture is displayed in response to the operation when it is decided that the operation is the operation intended to move the first picture out of the display region, wherein the second picture includes at least one second icon, the second icon is for indicating that the second application corresponding to the second icon is capable of being installed into the method.

In the above-described method, displaying the second picture comprises: deciding whether there is the second picture; and invoking the second picture when it is decided that there is the second picture and displaying the invoked second picture; generating the second picture when it is decided that there is no the second picture and displaying the generated second picture.

In the above-described method, displaying the second picture in response to the operation comprises: accessing a predetermined address in response to the operation to obtain data about the second picture; and generating the second picture based on the data about the second picture; and displaying the second picture.

In the above-described method, displaying the second picture in response to the operation comprises: receiving the data about the second picture from the predetermined address; generating the second picture based on the data about the second picture in response to the operation; and displaying the second picture.

In the above-described method, the first icon and the second icon are displayed in different display effects.

In the above-described method, displaying the second picture in response to the operation includes: adding at least one picture in the third application in response to the operation as the second picture; and displaying the second picture.

In the above-described method, displaying the second picture in response to the operation includes: starting the fourth application in response to the operation; and displaying the picture of the fourth application as the second picture.

In the above-described method, the second picture includes a third icon, wherein the third icon is for running a fifth applications installed in the electronic apparatus and corresponding to the third icon, wherein the fifth application is for accessing pages about the second application.

Similar to the above mentioned, in the case that the second and the third embodiments of the present disclosure are combined with the fourth embodiment of the present disclosure, the embodiment of the present disclosure provides a method for generating an application icon applied in a terminal apparatus, the method includes: installing the first application and generating the first icon corresponding to the first application in the application icon interface; displaying the first icon corresponding to the first application in the second display effect; receiving the prompt information of the second application from the server end automatically; generating the second icon corresponding to the second application in the application icon interface according to the prompt information; and displaying the second icon in the first display effect, wherein the first display effect is different from the second display effect.

In the above-described display method, the following are further included: detecting an operation when at least part of the first picture of the fourth application is displayed in the display region of the terminal apparatus, wherein the first picture includes the first icon and the second icon, the first icon and the second icon are for running the first application and the second application installed in the electronic apparatus and corresponding to the first icon and the second icon respectively; deciding whether the operation is the operation intended to move the first picture out of the display region; and displaying the second picture in response to the operation when it is decided that the operation is the operation intended to move the first picture out of the display region, wherein the second picture includes at least one third icon, the third icon is for indicating that the third application corresponding to the third icon is capable of being installed into the terminal apparatus.

In the above-described display method, displaying the second picture includes: deciding whether there is the second picture; and invoking the second picture when it is decided that there is the second picture and displaying the invoked second picture; generating the second picture when it is decided that there is no the second picture and displaying the generated second picture.

In the above-described display method, displaying the second picture in response to the operation comprises: accessing a predetermined address in response to the operation to obtain data about the second picture; generating the second picture based on the data about the second picture; and displaying the second picture.

In the above-described display method, displaying the second picture in response to the operation includes: receiving the data about the second picture from the predetermined address; generating the second picture based on the data about the second picture in response to the operation; and displaying the second picture.

In the above-described display method, the third icon is displayed in a display effect different from that of each of the first icon and the second icon.

In the above-described display method, displaying the second picture in response to the operation includes: adding at least one picture in the fourth application in response to the operation as the second picture; and displaying the second picture.

In the above-described display method, displaying the second picture in response to the operation includes: starting the fifth application in response to the operation; and displaying the picture of the fifth application as the second picture.

In the above-described display method, the second picture includes a fourth icon, wherein the fourth icon is for running a sixth application installed in the terminal apparatus and corresponding to the fourth icon, wherein the sixth application is for accessing pages about the third application.

Here, those skilled in the art can understand that the first embodiment to the fourth embodiment of the present disclosure should be applied according to practical situation, the scope intended to be protected by the embodiments of the present disclosure is not restricted by the specific words and expressions in the specification.

It should note that, in the specification, the term "comprise", "include" or any other variation thereof intends to cover nonexclusive inclusion so that the procedure, method, product or equipment including a series of elements not only include these elements, but also include other elements which are not listed explicitly, or also include inherent elements of such procedure, method, product or equipment. In the case that there is no further limitation, elements defined by the expression "comprise one" does not exclude that there are additional identical elements in the procedure, method, product or equipment of the elements.

Finally, it should note that, the above-described series of processing comprise not only the processing executed chronologically in the order mentioned here, and also the processing executed in parallel or individually but not chronologically.

Those skilled in the art can understand that the units and algorithm steps of respective examples described in combination with the embodiments disclosed in the specification can be implemented by electronic hardware, computer software or the combination of both, in order to explain the interchange ability of the hardware and the software, the constitution and steps of the respective examples are described generally according to the function in the above description. The functions are executed by hardware or software depends on the specific applications and design constraints of the technical solution. Those skilled in the art can implement the described functions by using different methods for each specific application, and such implementations are not regarded as beyond the scope of the application.

Although some embodiments of the present disclosure are shown and described, those skilled in the art should understand that, various modifications can be carried out to these embodiments without departing from the principles and spirits of the present disclosure, and such modifications should fall into the scope of the present disclosure.

The invention claimed is:

1. A terminal apparatus, comprising:
   a receiving unit configured to receive prompt information of a first application from a server automatically;
   an icon generating unit configured to generate a first icon corresponding to the first application in an application icon interface according to the prompt information received by the receiving unit;
   a first control unit configured to associate the first icon generated by the icon generating unit with a first function according to the prompt information, and control the first icon to be displayed in a first display effect;
   a first display unit configured to display the first icon generated by the icon generating unit in the first display effect
   a detecting unit for detecting an operation when at least part of a first picture of a third application is displayed in a display region of the terminal apparatus, wherein the first picture includes a second icon, the second icon is for running a second application installed in the display device;
   a second deciding unit for deciding whether the operation is an operation intended to move the first picture out of the display region; and
   a display processing unit for displaying a second picture in response to the operation when the second deciding unit decides that the operation is the operation intended to move the first picture out of the display region, wherein the second picture includes at least one of the first icon, the at least one of the first icon is for indicating that the first application corresponding to the first icon is capable of being installed into the terminal apparatus.

2. The terminal apparatus according to claim 1, further including:
   a first deciding unit configured to decide whether the first application has been installed in the terminal apparatus,
   the icon generating unit is further configured to generate the first icon corresponding to the first application in the application icon interface when the first deciding unit decides that the first application has not been installed in the terminal apparatus.

3. The terminal apparatus according to claim 1, wherein:
   the first function includes a deleting function and/or an installing function, the deleting function is for deleting the first icon, and the installing function is for downloading and installing the first application corresponding to the first icon,
   the terminal apparatus further includes:
   an input unit configured to receive a first selection input and a second selection input; and
   a second control unit configured to determine the icon to be processed in the icons displayed in the first display effect according to the first selection input, and execute the deleting function to the icon to be processed or execute the installing function to the application corresponding to the icon to be processed according to the second selection input.

4. The terminal apparatus according to claim 3, wherein:
   the second control unit generates installing completion information after installing the application corresponding to the icon to be processed;
   the first control unit is further configured to associate the icon to be processed and a second function according to the installing completion information, and control the icon to be processed to be displayed in a second display effect;
   the first display unit is further configured to display the icon to be processed in the second display effect, and
   the second function is for starting the application corresponding to the icon to be processed.

5. The terminal apparatus according to claim 1, wherein:
   the icon generating unit is further configured to record generating time of the first icon;
   the first control unit is further configured to compare a generating time period from the generating time to the current time with a predetermined threshold, and delete the first icon when the generating time period is more than the predetermined threshold.

6. The terminal apparatus according to claim 3, wherein:
   the first function further includes a collecting function and a collecting release function, wherein the collecting function is for keeping the first icon from being deleted and the collecting release function is for releasing the being-kept of the first icon, the second control unit is further configured to execute the collecting function or the collecting release function to the icon to be processed according to the second selection input.

7. The terminal apparatus according to claim 3, wherein:
the prompt information includes an installing information storage address;
when the second control unit executes the installing function to the application corresponding to the icon to be processed according to the second selection input, installing information is downloaded from the installing information storage address and the application corresponding to the icon to be processed is installed according to the installing information.

8. The terminal apparatus according to claim 1, wherein the display processing unit includes:
a third deciding unit for deciding whether there is the second picture;
an invoking unit for invoking the second picture when the second deciding unit decides that there is the second picture;
a first generating unit for generating the second picture when the third deciding unit decides that there is no the second picture; and
a second display unit for displaying the second picture.

9. The terminal apparatus according to claim 1, wherein the display processing unit includes:
a first acquiring unit for accessing a predetermined address in response to the operation to obtain data about the second picture;
a second generating unit for generating the second picture based on the data about the second picture; and
a third display unit for displaying the second picture.

10. The terminal apparatus according to claim 1, wherein the display processing unit includes:
a second acquiring unit for receiving data about the second picture from a predetermined address;
a third generating unit for generating the second picture in response to the operation based on the data about the second picture; and
a fourth display unit for displaying the second picture.

11. The terminal apparatus according to claim 1, wherein:
the display processing unit displays the first icon and the second icon in different display effects.

12. The terminal apparatus according to claim 1, wherein the display processing unit includes:
an adding unit for adding at least one picture in the third application in response to the operation as the second picture; and
a fifth display unit for displaying the second picture.

13. The terminal apparatus according to claim 1, wherein the display processing unit includes:
a starting unit for starting a fourth application in response to the operation; and
a sixth display unit for displaying the picture of the fourth application as the second picture.

14. The terminal apparatus according to claim 1, wherein, the second picture includes a third icon, wherein the third icon is for running a fifth applications installed in the terminal apparatus and corresponding to the third icon, wherein the fifth application is for accessing pages about the second application.

15. A terminal apparatus, comprising:
an installing unit configured to install a first application and generate a first icon corresponding to the first application in an application icon interface;
a first display unit configured to display a first icon corresponding to the first application in a second display effect;
a receiving unit configured to receive prompt information of a second application from a server end automatically;
an icon generating unit configured to generate a second icon corresponding to the second application in the application icon interface according to the prompt information received by the receiving unit;
the first display unit is further configured to display the second icon generated by the icon generating unit in a first display effect, wherein the first display effect is different from the second display effect
a detecting unit for detecting an operation when at least part of a first picture of a third application is displayed in a display region of the terminal apparatus, wherein the first picture includes the first icon, the first icon is for running the first application installed in the display device and corresponding to the first icon:
a first deciding unit for deciding whether the operation is the operation intended to move the first picture out of the display region: and
a display processing unit for displaying a second picture in response to the operation when the first deciding unit decides that the operation is the operation intended to move the first picture out of the display region, wherein the second picture includes at least one of the second icon, the at least one of the second icon is for indicating that the second application corresponding to the second icon is capable of being installed into the terminal apparatus.

16. The terminal apparatus according to claim 15, wherein:
the first icon is associated with a second function, wherein the second function is for starting the application corresponding to the icon,
the second icon is associated with a first function, wherein the first function includes a deleting function and/or an installing function, wherein the deleting function is for deleting the icon and the installing function is for downloading and installing the application corresponding to the icon.

17. The terminal apparatus according to claim 16, wherein:
the installing unit is further configured to execute the installing function to the application corresponding to the second icon according to an installing selection input to generate installing completion information;
the first display unit is further configured to display the second icon in the second display effect according to the installing completion information.

\* \* \* \* \*